US007869070B2

(12) United States Patent
Sugimoto

(10) Patent No.: US 7,869,070 B2
(45) Date of Patent: Jan. 11, 2011

(54) IMAGE FORMING DEVICE, IMAGE FORMING SYSTEM, IMAGE FORMING METHOD, IMAGE FORMING CONTROL PROGRAM, AND COMPUTER READABLE RECORDING MEDIUM IN WHICH IMAGE FORMING CONTROL PROGRAM IS RECORDED

(75) Inventor: Tadayuki Sugimoto, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1255 days.

(21) Appl. No.: 10/803,039

(22) Filed: Mar. 18, 2004

(65) Prior Publication Data

US 2005/0122539 A1 Jun. 9, 2005

(30) Foreign Application Priority Data

Dec. 4, 2003 (JP) .............................. 2003-406319

(51) Int. Cl.
*G06F 3/12* (2006.01)
(52) U.S. Cl. .................... 358/1.15; 358/1.13; 358/1.16; 358/403; 709/213; 709/224; 709/225; 709/239; 709/232; 348/207.1; 348/207.2
(58) Field of Classification Search ................ 358/1.13, 358/1.15, 1.16, 403; 709/213, 224, 225, 709/239, 232–235; 348/207.1, 207.2
See application file for complete search history.

(56) References Cited

U.S. PATENT DOCUMENTS 5,751,299 A * 5/1998 Denton et al. .................. 347/2

| | | | |
|---|---|---|---|
| 6,297,887 B1 * | 10/2001 | Yamauchi .................. 358/1.15 |
| 6,586,425 B2 * | 7/2003 | Kaufman et al. ............. 514/218 |
| 6,661,531 B1 * | 12/2003 | Murphy et al. ............. 358/1.15 |
| 6,709,176 B2 * | 3/2004 | Gotoh et al. .................. 400/61 |
| 6,862,102 B1 * | 3/2005 | Meisner et al. ............ 358/1.15 |
| 7,209,255 B2 * | 4/2007 | Kobayashi et al. ......... 358/1.15 |
| 7,240,099 B2 * | 7/2007 | Miyazaki et al. ........... 709/213 |
| 2004/0070672 A1 * | 4/2004 | Iwami et al. ............. 348/207.2 |
| 2004/0125415 A1 * | 7/2004 | Michiie et al. .............. 358/444 |

FOREIGN PATENT DOCUMENTS

| | | |
|---|---|---|
| JP | 04-298785 | 10/1992 |
| JP | 06-075718 | 3/1994 |
| JP | 09-309232 | 12/1997 |
| JP | A-10-226139 | 8/1998 |
| JP | 11-134119 | 5/1999 |
| JP | 2001-134411 | 5/2001 |
| JP | A-2001-268484 | 9/2001 |
| JP | A-2003-076649 | 3/2003 |
| JP | 2003-276283 | 9/2003 |

* cited by examiner

*Primary Examiner*—Chan S Park
(74) *Attorney, Agent, or Firm*—Finnegan, Henderson, Farabow, Garrett & Dunner, LLP

(57) ABSTRACT

A printer, as an image forming device, acquires data size of image data to be printed from the data storage device, and calculates the transfer completion time required for transferring the image data to be printed according to the acquired data size of the image data to be printed and a speed of transferring data via an external interface to be used.

37 Claims, 17 Drawing Sheets

| FIG. 5A |
| FIG. 5B |

| EXTERNAL INTERFACE | TRANSFER SPEED (THEORETICAL VALUE) | EXTERNAL INTERFACE | TRANSFER SPEED (THEORETICAL VALUE) |
|---|---|---|---|
| USB Low Speed | 1.5Mbps | BlueTooth® | 1Mbps |
| USB Full Speed | 12Mbps | IEEE802.11b | 11Mbps |
| USB High Speed | 480Mbps | IEEE802.11g | 54Mbps |
| IEEE1394 | 400Mbps | | |

205

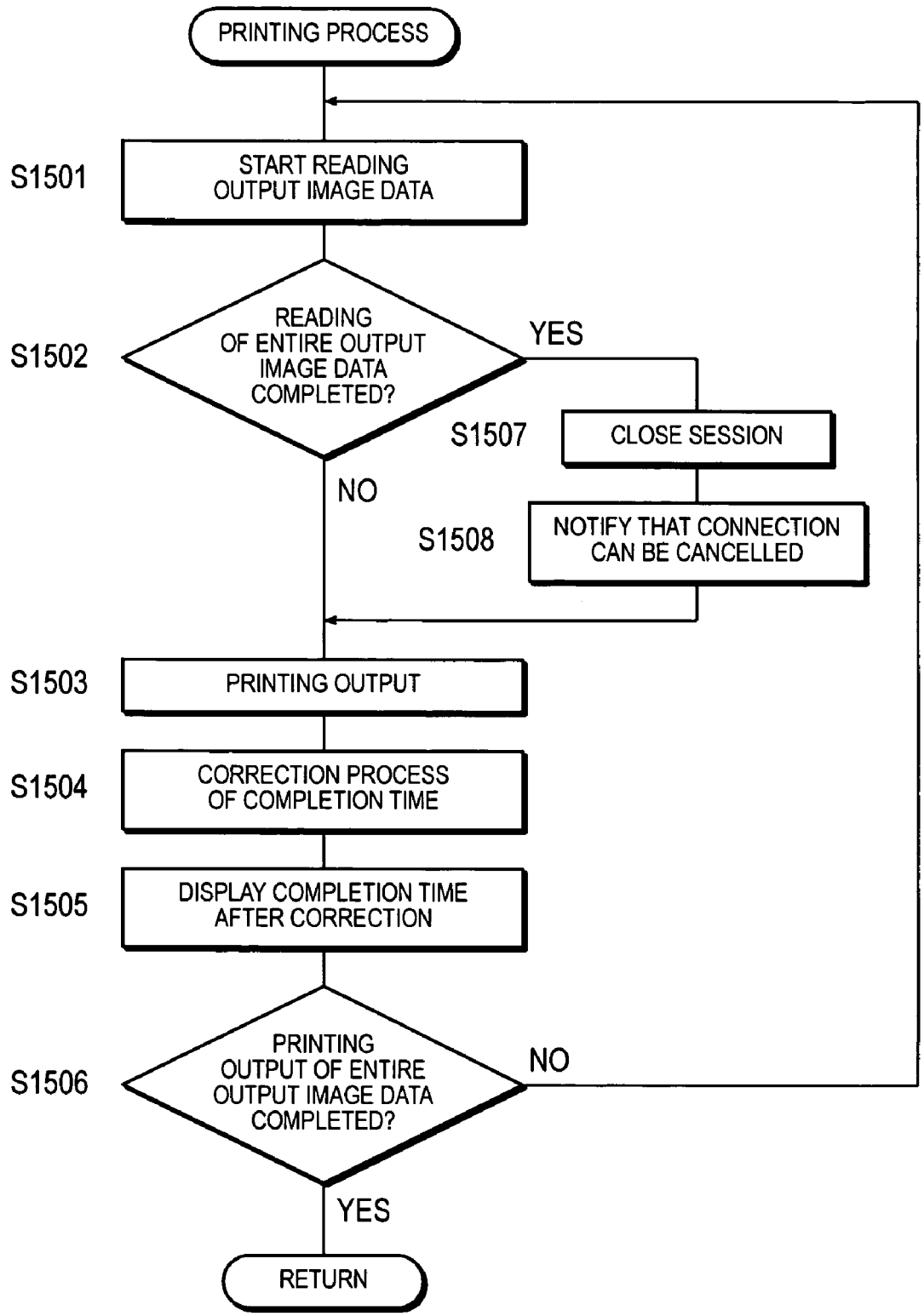

IMAGE FORMING DEVICE, IMAGE FORMING SYSTEM, IMAGE FORMING METHOD, IMAGE FORMING CONTROL PROGRAM, AND COMPUTER READABLE RECORDING MEDIUM IN WHICH IMAGE FORMING CONTROL PROGRAM IS RECORDED

This application is based on Japanese Patent Application No. 2003-406319, filed on Dec. 4, 2003, the contents of which are hereby incorporated by reference.

BACKGROUND OF THE INVENTION

1. Field of the Invention

This invention relates to an image forming device, an image forming system, an image forming method, an image forming control program, and a computer readable recording medium in which the image forming control program is recorded for forming an image formed from image data transferred from a portable image data storage device via an external interface connectable with said image data storage device.

2. Description of the Related Art

In printing image data obtained by means of a digital camera, it is possible to transfer image data from a PC (personal computer) to a printer for printing after taking the image data from the digital camera into the PC. However, this method cannot be used by a user who doesn't own a PC and the operation is complicated. As a means of solving this problem, a technology has been disclosed to connect a digital camera directly to a printer without going through a PC (Unexamined Publication No. JP-A-2003-276283).

Unexamined Publication No. JP-A-2003-276283 also discloses, as the methods of connecting the digital camera to the printer, a method of using a cable and a method of using a wireless communication interface.

However, although a plurality of methods is presented for directly connecting an image data storage device such as a digital camera to a printer, a user can only recognize that there is a plurality of external interfaces. In other words, no information is provided for the user to select an appropriate one from a plurality of external interfaces, thus causing a problem that the user cannot select and use an appropriate one form the available external interfaces according to time and circumstances.

On the other hand, several technologies are disclosed for calculating the printer's printing completion time in advance (Unexamined Publications No. JP-A-11-134119, No. JP-A-09-309232, and No. JP-A-06-075718). However, these technologies are not the technologies for connecting a digital camera directly to a printer for printing process, and have no considerations for the difference in the transfer speed of image data depending on the type of the external interface. Therefore, the technologies disclosed by Unexamined Publications No. JP-A-11-134119, No. JP-A-09-309232, and No. JP-A-06-075718 do not provide sufficient information for the user to select an appropriate one from a plurality of external interfaces connectable with the digital camera.

SUMMARY OF THE INVENTION

It is an object of the present invention to provide an image forming device, an image forming system, an image forming method, an image forming control program, and a computer readable recording medium in which the image forming control program is recorded, all of which are improved to solve the abovementioned problems.

It is a more specific object of the invention to provide an image forming device, an image forming system, an image forming method, an image forming control program, and a computer readable recording medium in which the image forming control program is recorded for providing in advance information of time required for transferring image data from a portable image data storage device to an image forming device via an external interface connectable with said image data storage device.

According to an aspect of the invention, there is provided an image forming device for forming an image from image data transferred from a portable image data storage device via an external interface that can be connected to said image data storage device, comprising: a data size acquiring unit that acquires data size of image data, for which an image is formed, from said image data storage device; and a calculating unit for calculating transfer completion time required for transferring said image data, for which an image is formed, based on said data size of the image data acquired by said data size acquiring unit and a speed of transferring data via said external interface.

According to the present invention, it is possible to provide in advance information of time required for transferring image data from the image data storage device to the image forming device via the external interface. Thus, it is possible for the user to know the completion of the transfer of the output image data via the external interface and to disconnect the connection via said external interface before the image forming output is completed. Therefore, the image data storage device can be used for other purposes sooner to provide an environment for more effective usage of the image data storage device. Moreover, it is possible to obtain the transfer completion time that corresponds to each of a plurality of external interfaces as information so that the user can select an appropriate external interface each time.

According to another aspect of the invention, there is provided an image forming system, comprising: a digital camera; and an image forming device for forming an image from image data transferred from said digital camera via an external interface that can be connected to said digital camera; said digital camera including: a transmitting unit for transmitting data size of image data, for which an image is formed, to said image forming device; said image forming device including: a receiving unit for receiving the data size of the image data, for which an image is formed, from said digital camera; and a calculation unit for calculating transfer completion time required for transferring said image data, for which an image is formed, based on said data size of the image data received by said receiving unit and a speed of transferring data via said external interface.

According to still another aspect of the invention, there is provided an image forming method for forming an image from image data transferred from a portable image data storage device via an external interface that can be connected to said image data storage device, comprising the steps of: 1) acquiring data size of image data, for which an image is formed, from said image data storage device; and 2) calculating transfer completion time required for transferring said image data, for which an image is formed, based on said data size of the image data acquired in step 1) and a speed of transferring data via said external interface.

According to a further aspect of the invention, there is provided an image forming control program for controlling an image forming device for forming an image from image data transferred from a portable image data storage device via an external interface that can be connected to said image data storage device, said program causing the image forming device to execute a process comprising the steps of: 1) acquiring data size of image data, for which an image is formed, from said image data storage device; and 2) calculating transfer completion time required for transferring said image data, for which an image is formed, based on said data size of the image data acquired in step 1) and a speed of transferring data via said external interface.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 20 is a flowchart showing the contents of a printing process.

DETAILED DESCRIPTION OF THE PREFERRED EMBODIMENTS

The embodiments of this invention will be described below with reference to the accompanying drawings.

Figure 1:
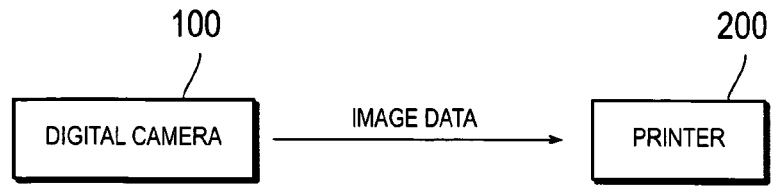
FIG. 1 is a block diagram showing the constitution of a printing system.

FIG. 1 is a diagram showing the constitution of a printing system. The printing system shown in FIG. 1 has a digital camera 100 as a portable image data storage-device and a printer 200 as an image forming device.

The printer 200 can print image data transferred from the digital camera 100 via an external interface connectable with the digital camera 100. The digital camera 100 and the printer 200 can be directly connected without going through a PC. Therefore, the image data stored in the digital camera 100 is transferred to the printer 200 without being converted into print data described in a PDL (page description language) such as PS (Postscript®) by a printer driver.

Figure 2A:
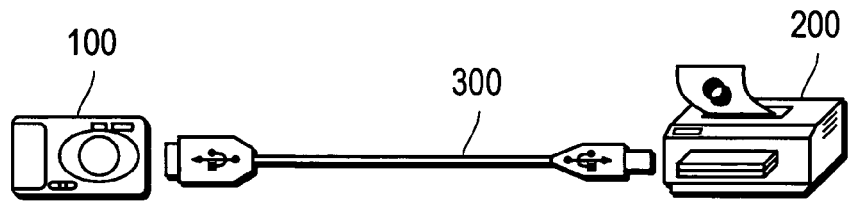
FIG. 2A, FIG. 2B, and FIG. 2C are schematic drawings for describing the methods of transferring image data to a printer.
Figure 2B:
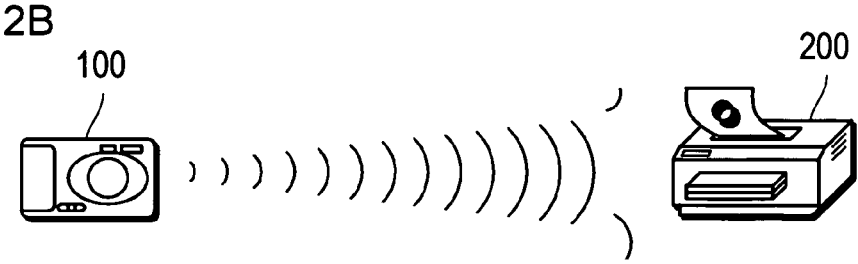
Figure 2C:
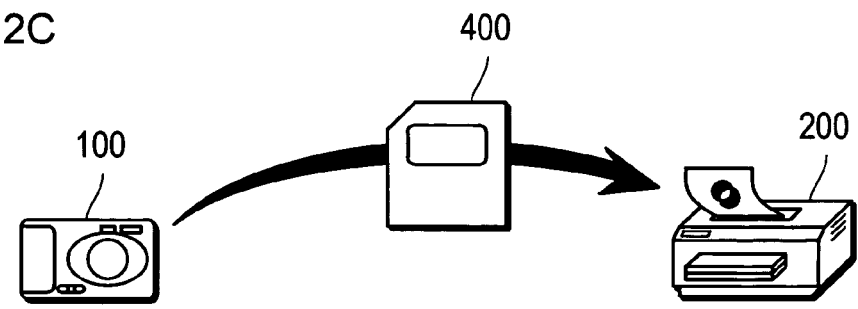

FIG. 2A, FIG. 2B, and FIG. 2C are schematic drawings for describing the methods of transferring image data to the printer 200. As shown in FIG. 2A, the digital camera 100 and the printer 200 can be connected via a cable 300 for direct wired communications based on standards such as USB or IEEE1394. Also, as shown in FIG. 2B, the digital camera 100 and the printer 200 can be connected for direct wireless communications based on standards such as IrDA, Bluetooth®, or wireless LAN. They can also communicate based on a proprietary standard of the specific digital camera and printer. Also, as shown in FIG. 2C, image data acquired by the digital camera 100 can be transferred to the printer 200 via a memory card 400 as a portable image data storage device.

Figure 3:
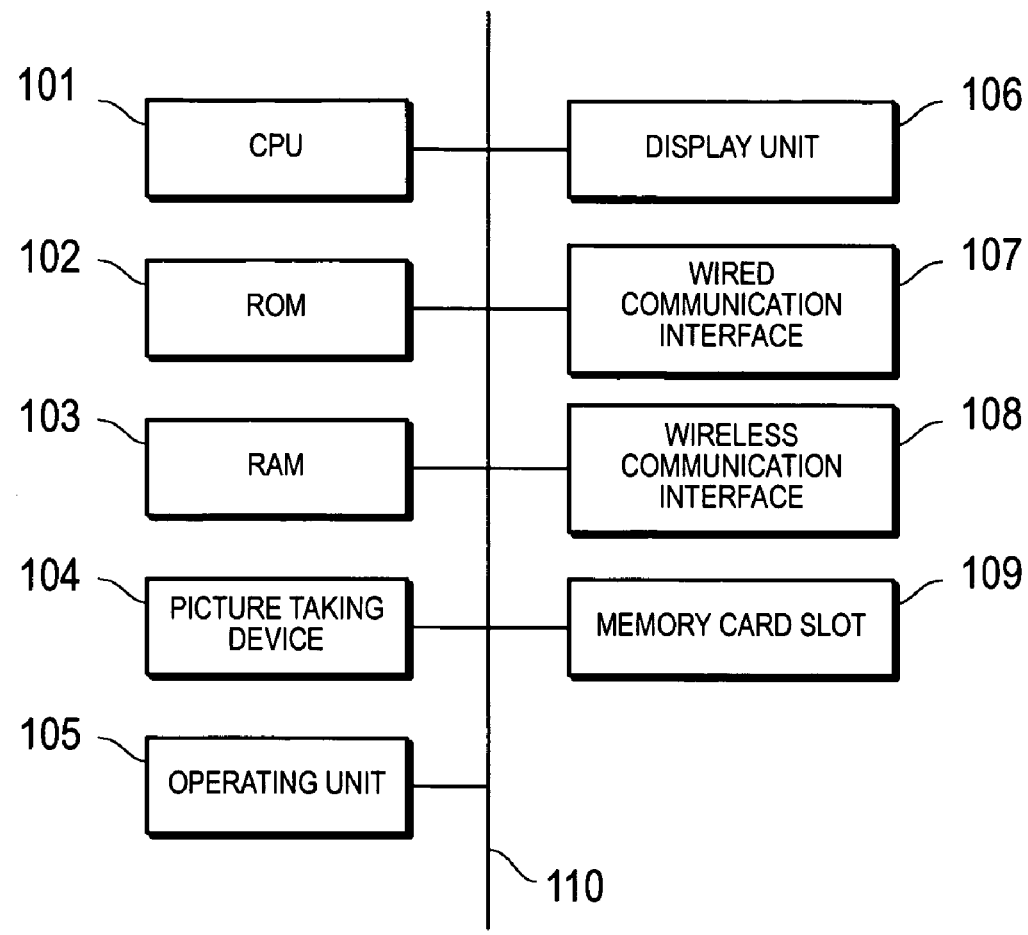
FIG. 3 is a block diagram showing the constitution of a digital camera.

FIG. 3 is a block diagram showing the constitution of the digital camera 100. As shown in FIG. 3, the digital camera 100 includes a CPU 101, a ROM 102, a RAM 103, a picture taking device 104, an operating unit 105, a display unit 106, and a wired communication interface 107, a wireless communication interface 108, and a memory card slot 109, all of which are interconnected by a bus 110 for exchanging signals.

The CPU 101 controls various parts indicated above and executes various arithmetic processes according to a program. The ROM 102 stores control programs including BIOS and data. The ROM 102 stores character font data. The RAM 103 stores programs and data temporarily as a working area.

The picture taking device 104 acquires image data by taking a picture of an object. The Operating unit 105 is used for entering various instructions and the display unit 106 is used for displaying various types of information.

The wired communication interface 107 is an interface for wire communication with the printer 200 and is an interface based on a wired communication standard such as USB. The wireless communication interface 108 is an interface for wireless communication with the printer 200 and is an interface based on a wireless communication standard such as IrD. The memory card slot 109 is a connecting unit for connection with a memory card 400 capable of storing image data.

Figure 4:
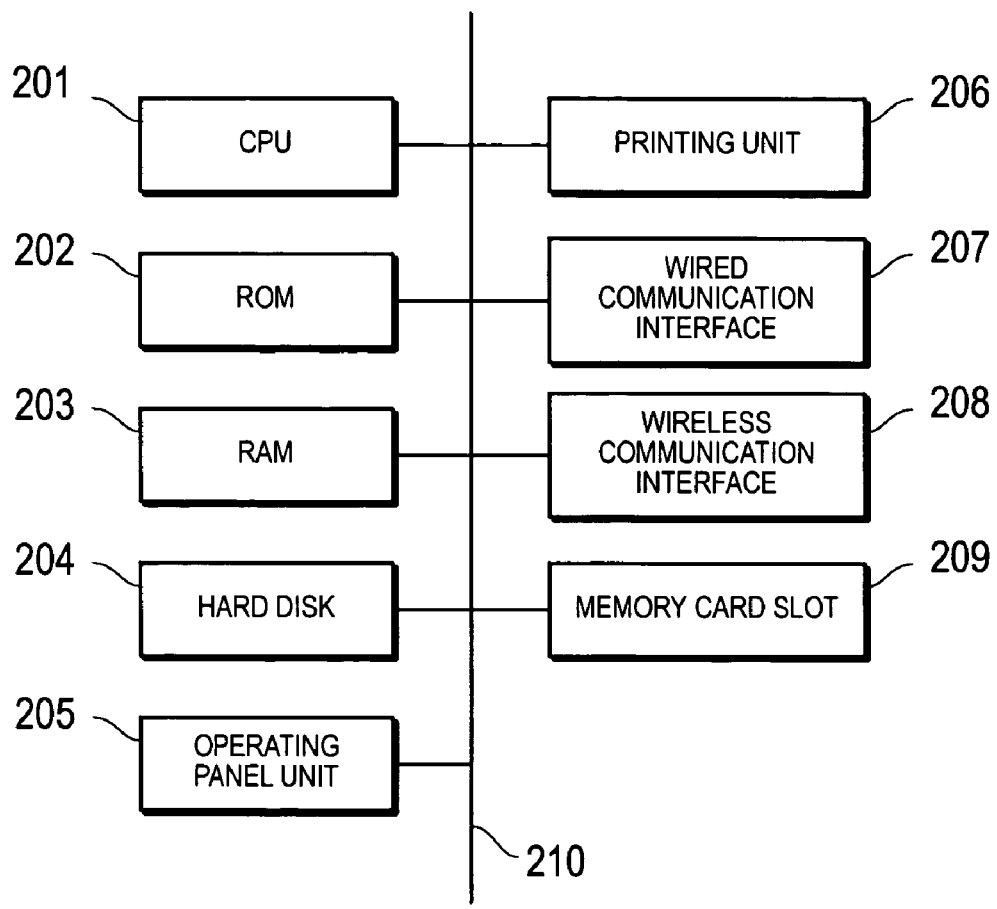
FIG. 4 is a block diagram showing the constitution of a printer.

FIG. 4 is a block diagram showing the constitution of the printer 200. As shown in FIG. 4, the printer 200 includes a CPU 201, a ROM 202, a RAM 203, a hard disk 204, an operating panel unit 205, a printing unit 206, and a wired communication interface 207, a wireless communication interface 208, and a memory card slot 209, all of which are interconnected by a bus 210 for exchanging signals. As for the components of identical functions as those of the digital camera 100, duplicating descriptions are omitted.

The hard disk 204 stores various programs and data. The operating panel unit 205 is used for displaying various types of information and entering various instructions. The printing unit 206 prints various data on a recording element such as paper using a known image forming process such as an electrophotoaraphy type process.

The wired communication interface 207, the wireless communication interface 208, and the memory card slot 209 function as external interface of the printer 200 of the present invention. The wired communication interface 207, the wireless communication interface 208, and the memory card slot 209 correspond with the wired communication interface 107, the wireless communication interface 108, and the memory card slot 109 of the digital camera 100 respectively. The memory card 400 can be inserted to and connected with the memory card slot 209 via an adaptor.

The digital camera 100 and the printer 200 can include constitutional elements other than those described above, or may not include a portion of the abovementioned elements.

The operation of the printing system in this embodiment will be described in the following.

First, with reference to FIG. 5 through FIG. 15, the operation will be described for a case when either the wired communication interface 207 or the wireless communication interface 208 of the printer 200 is used as the external interface for communicating with the digital camera 100. The operation of a case when the memory card slot 209 of the printer 200 is used as the external interface will be described later using a different drawing for the sake of convenience of the description.

FIG. 5 through FIG. 8 are flowcharts showing the contents of a process on the digital camera 100. The algorithm indicated by the flowcharts of FIG. 5 through FIG. 8 is stored as a control program in the ROM 102 of the digital camera 100, read out by the RAM 103, and is executed by the CPU 101 when the operation starts.

Figures 5, 5A:
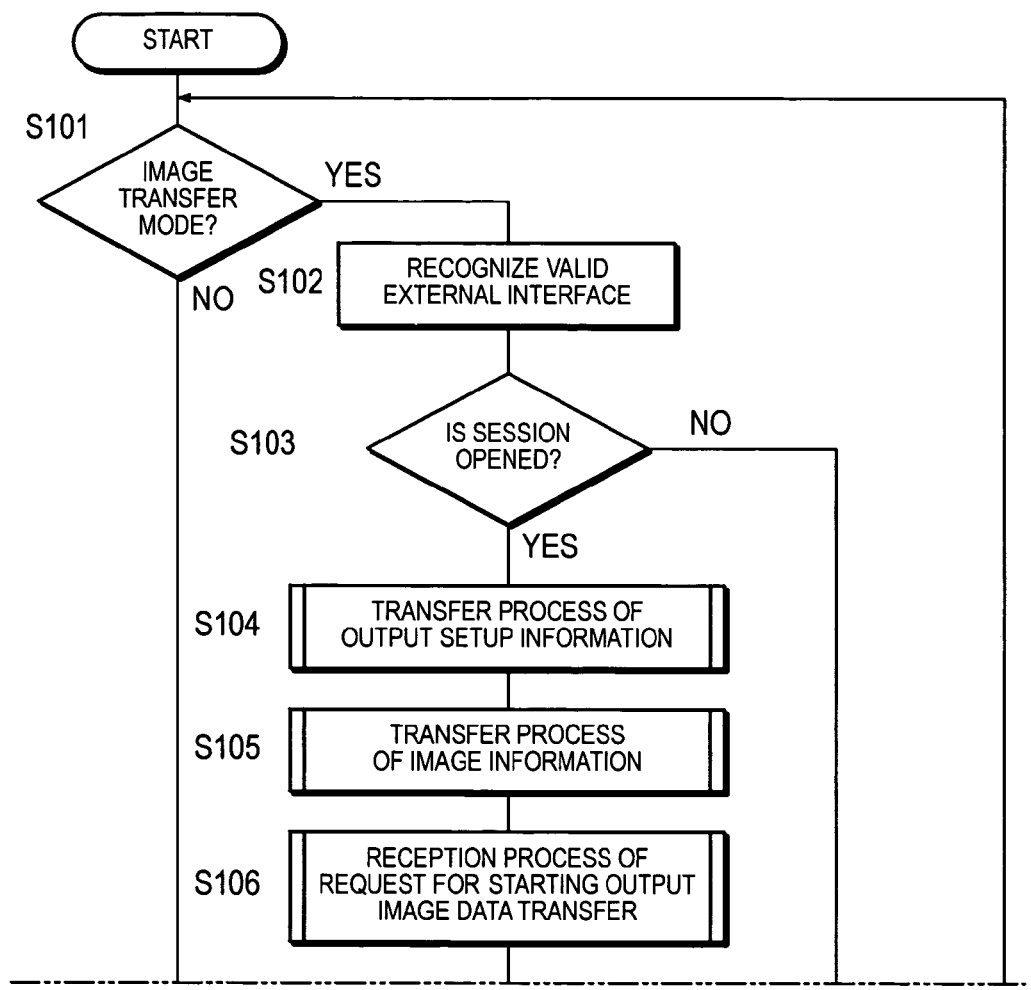
FIG. 5 is a flowchart showing the contents of a process on the digital camera.
Figure 5B:
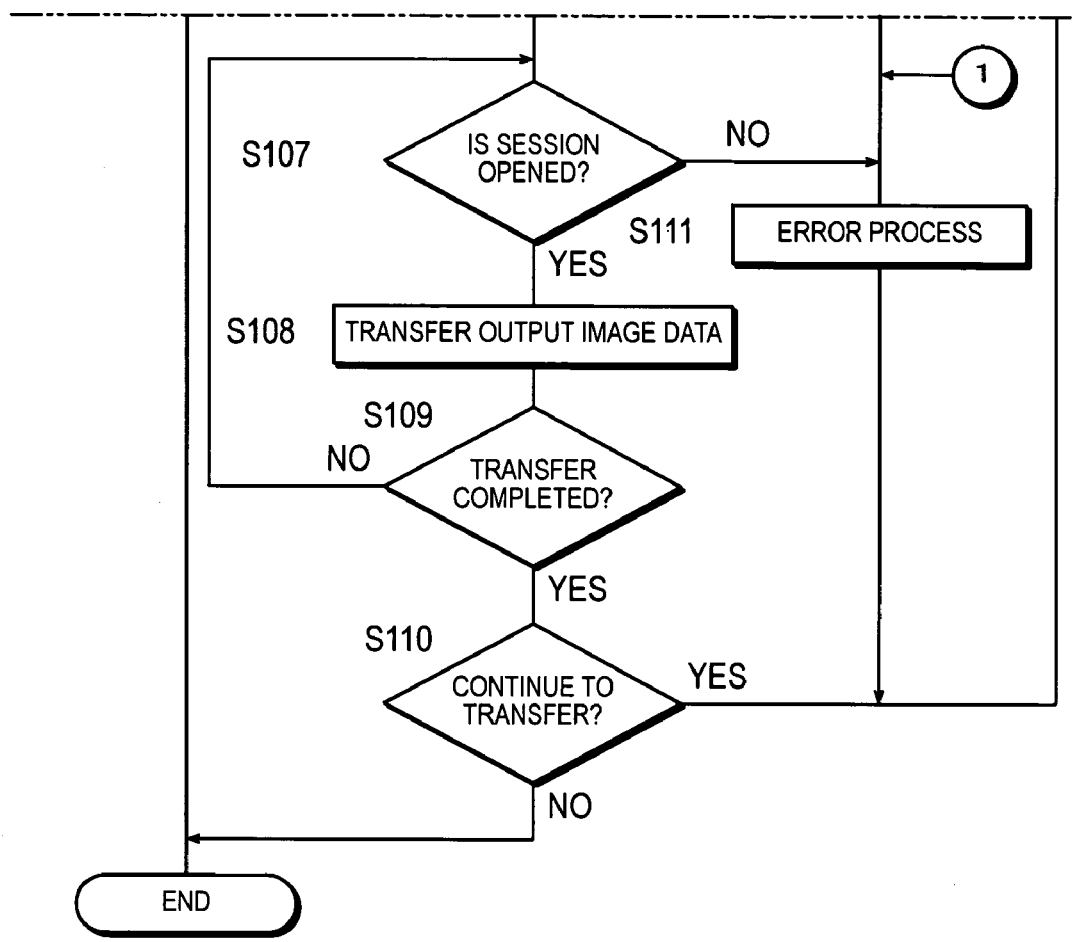

First, the digital camera 100 executes the confirmation of the processing mode, and makes a judgment on whether an image transfer mode for transferring image data different from the conventional picture taking mode is set up or not (S101) The case when image transfer mode is set up includes a case when the image transfer mode is set up based on the user's operation, and a case when the digital camera's power is turned on while it is in the image transfer mode. If the image transfer mode is not set up (S101: No), the process indicated in FIG. 5 is terminated.

If the image transfer mode is set up (S101: Yes), the digital camera 100 recognizes the currently valid external interface (S102). The valid external interface here means an external interface currently used for connecting with the printer 200.

Next, the digital camera 100 makes a judgment whether a session with the printer 200 via the recognized external interface is opened or not (S103). For example, if the opening of a session with the printer 200 cannot be confirmed even after a certain period of time (S103: No), the digital camera 100 executes error processes such as displaying a specified error message on the display unit 106 (S111), and the program returns to step S101.

If the opening of a session with the printer 200 is confirmed (S103: Yes), the transfer process of output setup information is executed (S104).

Figure 6:
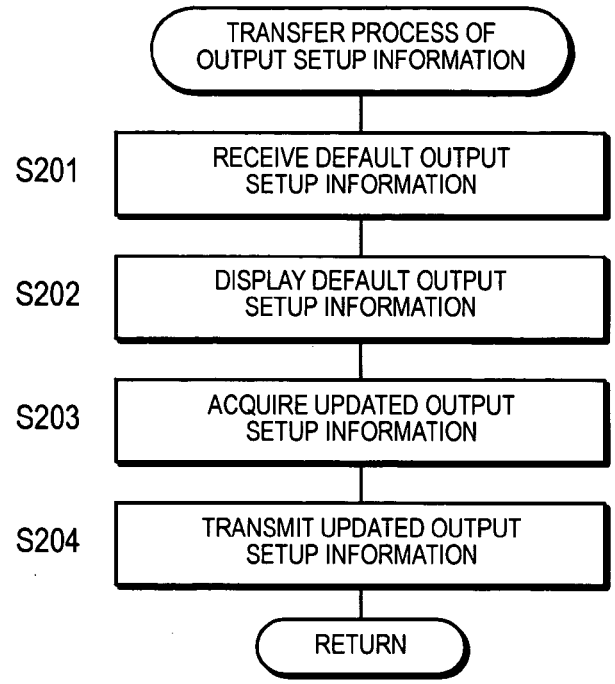
FIG. 6 is a flowchart showing the contents of an output setup information transfer process.

FIG. 6 is a flowchart showing the contents of the output setup information transfer process in step S104. In the transfer process of the output setup information, the digital camera 100 first receives the default output setup information from the printer 200 (S201), and displays the particular output setup information on the display unit 106 (S202).

At this point, the user can modify an arbitrary item of the output setup information as needed by means of the operating unit 105. The output setup information is information set up concerning the printing output condition including the number of printing, paper size, instruction for double sided printing, instruction for N-in-1 printing (function of laying out an N page portion of data into a single page output dada), and the resolution of printed images. Some printers may not be able to perform double sided printing. Therefore, the items that can be set up as the output setup information can be modified.

The digital camera 100 acquires output setup information updated as needed based on the user's operation (S203). The output setup information updated as needed is transmitted to the printer 200 (S204).

The program then returns to the flowchart of FIG. 5, and the process of transferring the image information is executed (S105).

Figure 7:
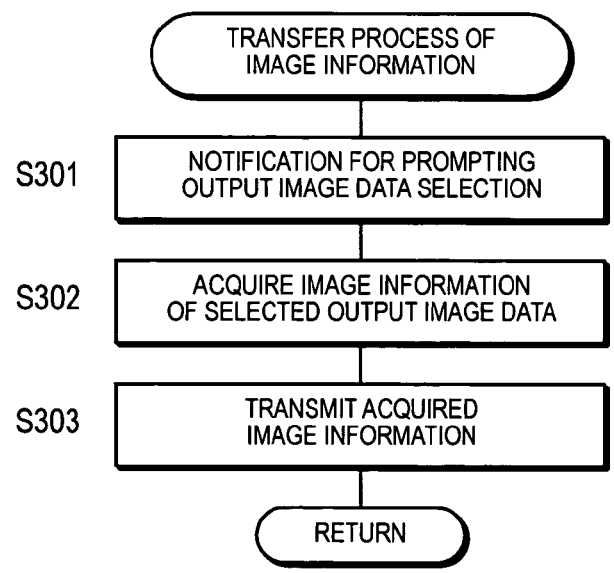
FIG. 7 is a flowchart showing the contents of an image information transfer process.

FIG. 7 is a flowchart showing the contents of the image information transfer process in step S105. In the image information transfer process, the digital camera 100 displays on the display unit 106 a notice for prompting the user to select the image data to be printed ("output image data") among the stored image data (S301). For example, items such as the output of all the image data and only the selected image data are displayed on the display unit 106. When the item of all the image data output is selected, all the image data stored in the memory (including the memory card 400) of the digital camera 100 will be selected automatically as the output image data. When the item of only the selected image data is selected, the items such as the index of all the image data stored will be displayed on the display unit 106. The user can select here arbitrary image data as output image data. It is possible to select a plurality of image data.

Next, image information, which is the information of the output image data, is acquired (S302). The image information can include the total number of output image data, the format of the output image data, the file name of each output image data, the data size (capacity) of each output image data, the resolution of each output image data, etc. The digital camera 100 transmits the acquired image information to the printer 200 (S303).

The program then returns to the flowchart of FIG. 5, and the process of receiving the request for starting the output image data transfer is executed (S106).

Figure 8:
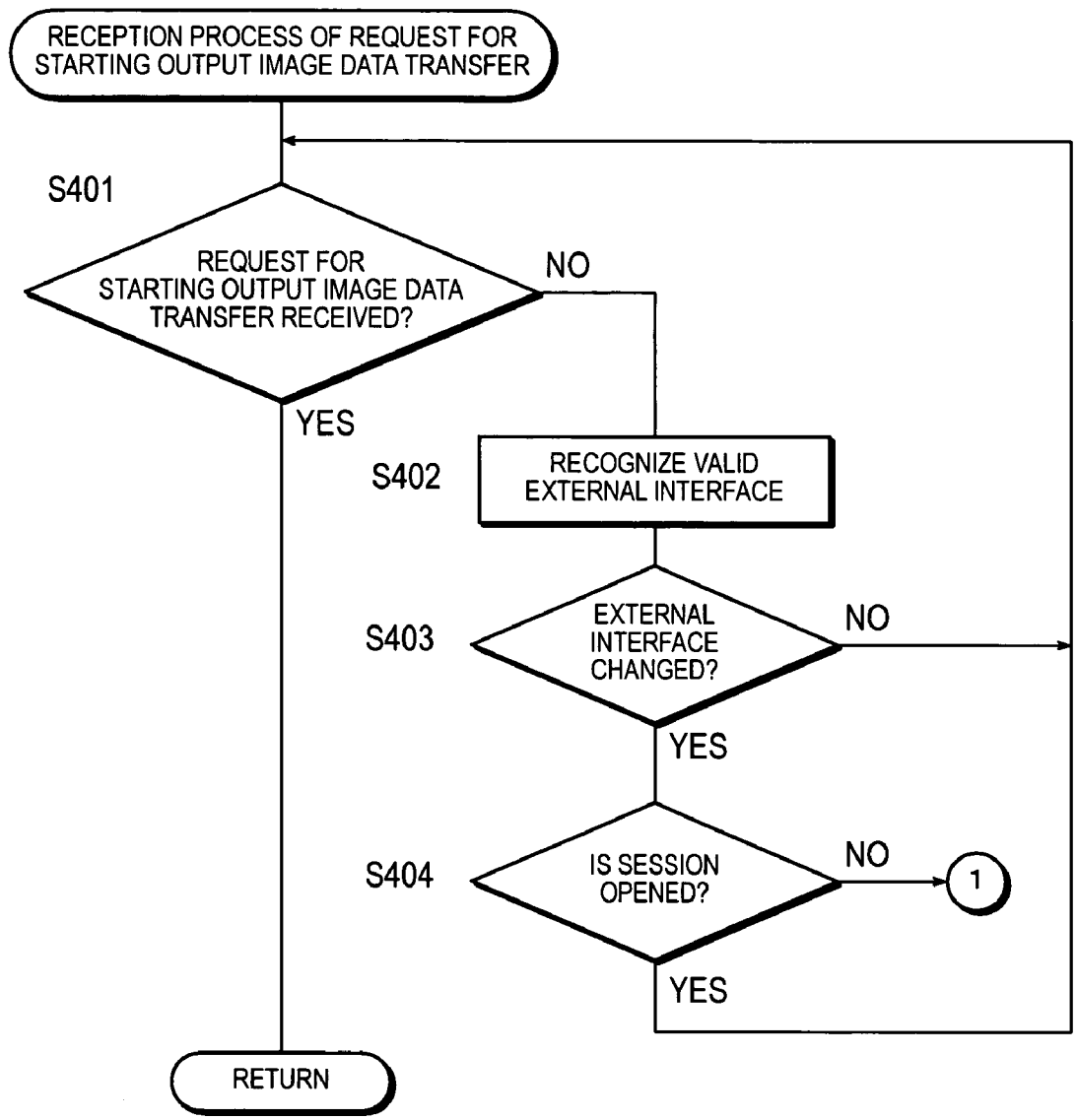
FIG. 8 is a flowchart showing the contents of a reception process of a request for starting output image data transfer.

FIG. 8 is a flowchart showing the contents of the process of receiving the request for starting the output image data transfer in step S106. There are cases where the user changes the external interface used in connection with printer 200, while the printer 200 is calculating the transfer completion time concerning the transfer of the output image data and the output completion time concerning the printing output as described later. Therefore, the digital camera 100 keeps repeating the confirmation of the receiving of the request for starting the output image data transfer and the confirmation of the valid external interface until the digital camera 100 receives the request for starting the output image data transfer from the printer 200.

In other words, in the process of receiving the request for starting the output image data transfer, the digital camera 100 makes a judgment on whether the digital camera 100 has received the request for starting the output image transfer from the printer 200 or not (S401).

If it is judged that the request for starting the output image data transfer has not been received (S401: No), the currently valid external interface will be recognized (S402).

Next, a judgment is made whether the external interface is changed or not based on the result of recognition in step S402 (S403). If the external interface has not been changed (S403: No), the program returns to step S401.

If the external interface has been changed (S403: Yes), the digital camera 100 makes a judgment whether a session with the printer 200 is opened via the changed external interface or not (S404). For example, if the opening of a session with the printer 200 is not confirmed (S404: No), the program advances to step S111 of the flowchart of FIG. 5. If the opening of a session with the printer 200 is confirmed (S404: Yes), the program returns to step S401.

On the other hand, if it is judged that the request for starting the output image data transfer is received in step S401 (S401: Yes), the program returns to the flowchart of FIG. 5.

Returning to the flowchart of FIG. 5, a judgment is made as to whether a session with the printer 200 is opened or not (S107). This is to confirm from time to time whether a session is opened while the output image data is being transferred as described later. When a session is closed before the output image data transfer is completed (S107: No), the program advances to step S111. In this case, the acquired output setup information and image information are discarded and the program returns to step S101.

When it is judged that a session with the printer 200 is opened (S107: Yes), the digital camera 100 transfers the output image data sequentially to the printer 200 based on the acquired image information (S108).

If the transfer of output image data is not completed (S109: No), the program returns to the step S107 and the process of the steps S107 and S108 will be repeated.

If the transfer of the output image data is completed (S109: Yes), a judgment is made as to whether the transfer process of the image data should be continued or not (S110). At this point, items for selecting whether the image data transfer process to be continued or not are displayed on the display unit 106.

If an item for continuing the image data transfer process is selected (S110: Yes), the program returns to step S101; if an item for not continuing the image data transfer process is selected (S110: No), the process shown in FIG. 5 is terminated.

FIG. 9 through FIG. 12 are flowcharts showing the contents of the process on the printer 200. The algorithm indicated by the flowcharts of FIG. 9 through FIG. 12 is stored as a control program in a storage unit of the printer 200 such as the hard disk 204, read out by the RAM 203, and is executed by the CPU 201 when the operation starts.

Figure 9:
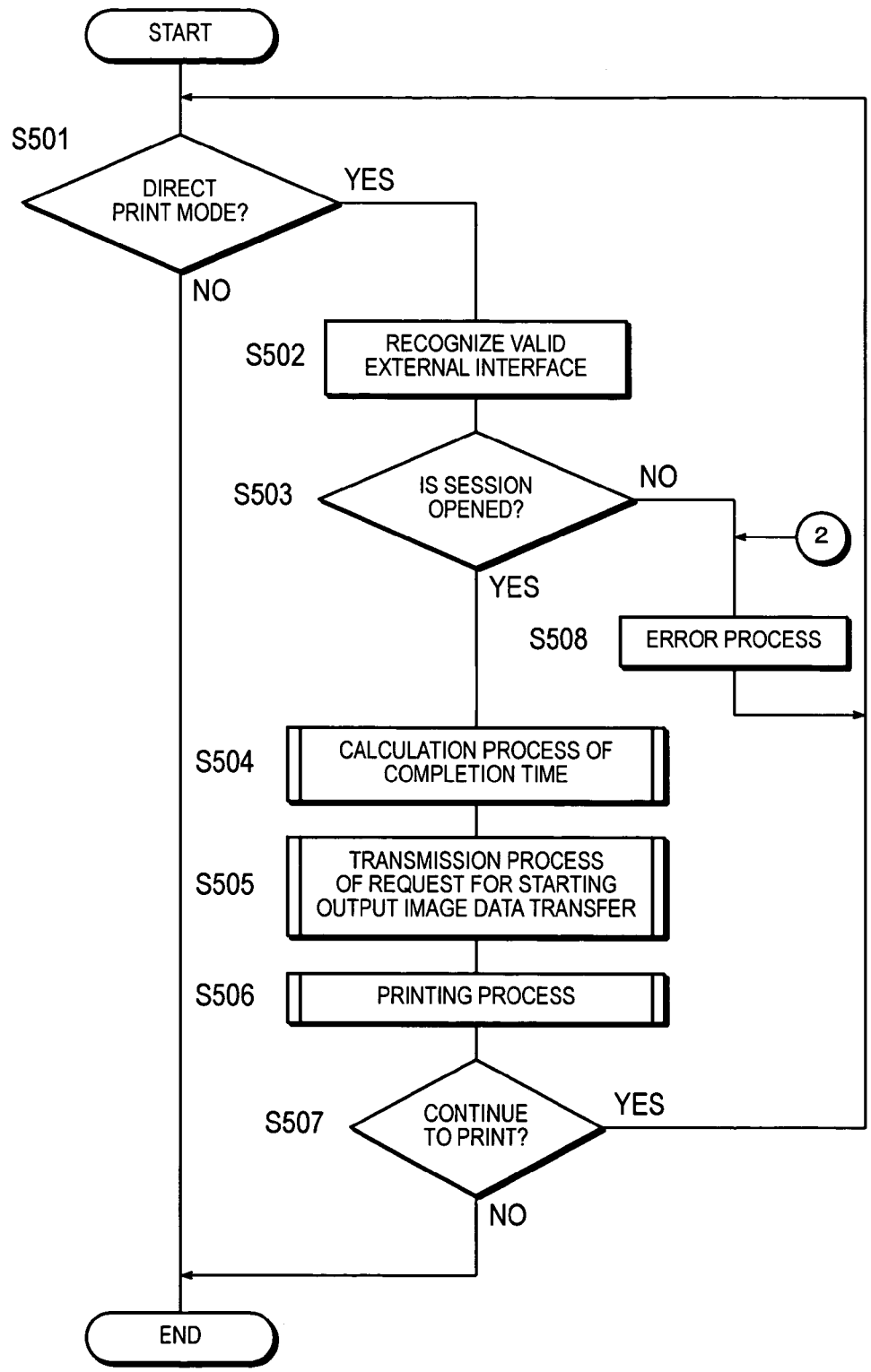
FIG. 9 is a flowchart showing the contents of a process on the printer.

First, the printer 200 confirms the processing mode and makes a judgment as to whether a direct print mode different from a normal print mode is set up or not (S501). The direct print mode is a mode that performs a printing process upon receiving image data without it being converted into print data by the printer driver. The case when the direct print mode is set up includes a case when the direct print mode is set up based on the user's operation, and a case when the printer's power is turned on while it is in the direct print mode. If the direct print mode is not set up (S501: No), the process of FIG. 9 is terminated.

If the direct print mode is set up (S501: Yes), the currently valid external interface is recognized (S502). The valid external interface here means an external interface currently used for connecting with the digital camera 100.

Next, the printer 200 makes a judgment whether a session with the digital camera 100 via the recognized external interface is opened or not (S503). For example, if the opening of a session with the digital camera 100 cannot be confirmed even after a certain period of time (S503: No), the printer 200 executes error processes such as displaying a specified error message on the operating panel unit 205 (S508), and the program returns to step S501.

If the opening of a session with the printer 200 is confirmed (S503: Yes), the calculation process of the completion time is executed (S504).

Figure 10:
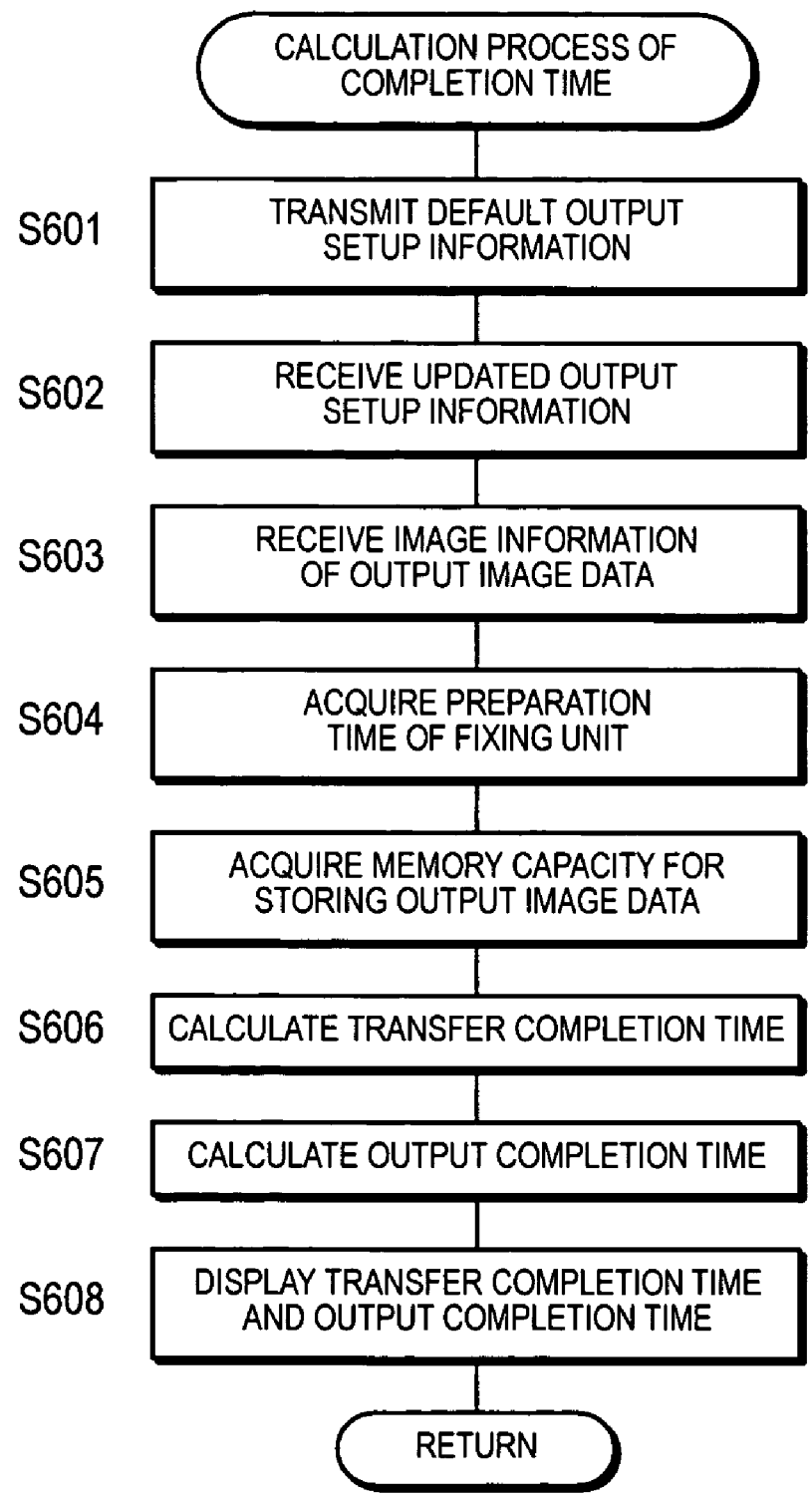
FIG. 10 is a flowchart showing the contents of a calculation process of completion time.

FIG. 10 is a flowchart showing the contents of the calculation process of the completion time in step S504. In the calculation process of the completion time, the printer 200 transmits the default output setup information to the digital camera 100 (S601). After the transmission of the default output setup information, the printer 200 waits for updated output setup information to be delivered from the digital camera 100 as needed. The contents of the output setup information are as mentioned before.

The printer 200 receives updated output setup information from the digital camera 100 (S602), and stores the received output setup information separate from the default output setup information in a storage unit such as the RAM 203. After receiving the updated output setup information, the printer 200 waits for the image information of the output image data to be delivered from the digital camera 100. The contents of the image information are as mentioned before.

The printer 200 receives the image information from the digital camera 100 (S603) and stores the received image information in the storage unit such as the RAM 203.

Next, the printer 200 acquires the preparation time for the fixing unit (not shown) in printing unit 206. The fixing unit is used to fix the toner on paper by applying heat and pressure on the paper. More specifically, the printer 200 measures the current temperature of the fixing unit and calculates the time necessary to raise the temperature of the fixing unit to the printable condition. The printer 200 also acquires the capacity of the memory such as the RAM 203 that can store the output image data (S605). If the hard disk is built in, the usable capacity of the hard disk is also acquired.

Using various types of information thus acquired, the printer 200 calculates the transfer completion time needed for transferring the output image data and the output completion time needed for printing output (S606 and S607). The transfer completion time and the output completion time here are calculated in response to all the external interfaces usable on the printer respectively. The calculated transfer completion time and output completion time are displayed on the operating panel unit 205 (S608). However, the calculated transfer completion time and output completion time can be transmitted to the digital camera 100 and displayed on the display unit 106 of the digital camera 100.

Figures 13, 14:
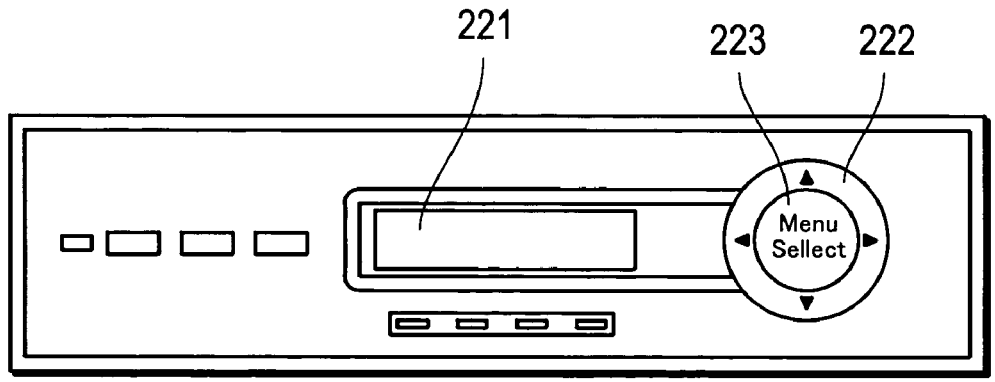
FIG. 13 is a diagram showing the theoretical values of the data transfer speeds of major external interfaces.
FIG. 14 is a view of an example operating panel unit.

In the calculation of the transfer completion time and the output completion time, the theoretical speed of transferring data via an external interface is used as the speed of transferring data via the particular external interface. FIG. 13 shows the theoretical values of the data transfer speeds of major external interfaces. However, it is also possible to store the actual data transfer speed used in the past printing output in a storage unit, and use this stored data transfer speed as the data transfer speed via the external interface.

The transfer completion time T1 can be calculated by the following formulas:

$$T1 = Tr + Tir$$

where

Tr: time required for receiving the entire output image data;
Tir: the sum of the interruption times during the reception of the entire output image data; and Tr and Tir can be obtained from the following formulas:

Tr=(sum of data size of output image data)/(data transfer speed via an external interface to be used).

Tir=sum of (data reception interruption time that occurs in correspondence with memory capacity usable of data storage, data transfer speed via external interface to be used, output image data format, and output setup information and the time required for rasterizing the unit size data) For example, data reception interruption can occur when the rasterizing process does not catch up with the data reception.

The output completion time T2 can be calculated by the following formulas:

$$T2 = Ts + To + Tio$$

where

Ts: time from the start of the output image data reception until it becomes possible to start the printing process;

To: time required for printing the entire output image data;

Tio: the sum of the interruption times during the printing of the entire output image data; and Ts, To and Tio can be obtained from the following formulas:

Ts=(necessary data reception quantity before start of printing process is enabled based on image format, etc.)/(data transfer speed via external interface to be used)+(preparation time of fixing unit). The data required to be accumulated for enabling the start of printing process is a specific proportion of the output image data of a single sheet of paper.

To=sum of ((data size of each output image data)*(time required for rasterizing unit size of data based on the output setup information and the format of the output image data))+ (time from the end of rasterization until the last printed sheet of paper is discharged).

Tio=sum of (data process interruption time that occurs in correspondence with memory capacity usable of data storage, data transfer speed via external interface to be used, output image data format, and output setup information and the time required for rasterizing the unit size data) For example, interruptions of rasterization process can occur when a plurality of copying outputs is performed by rasterizing once where there is a plurality of copies of printing is required.

The program then returns to the flowchart of FIG. 9, and the process of transmitting the request for starting output image data transfer is execute (S505).

Figure 11:
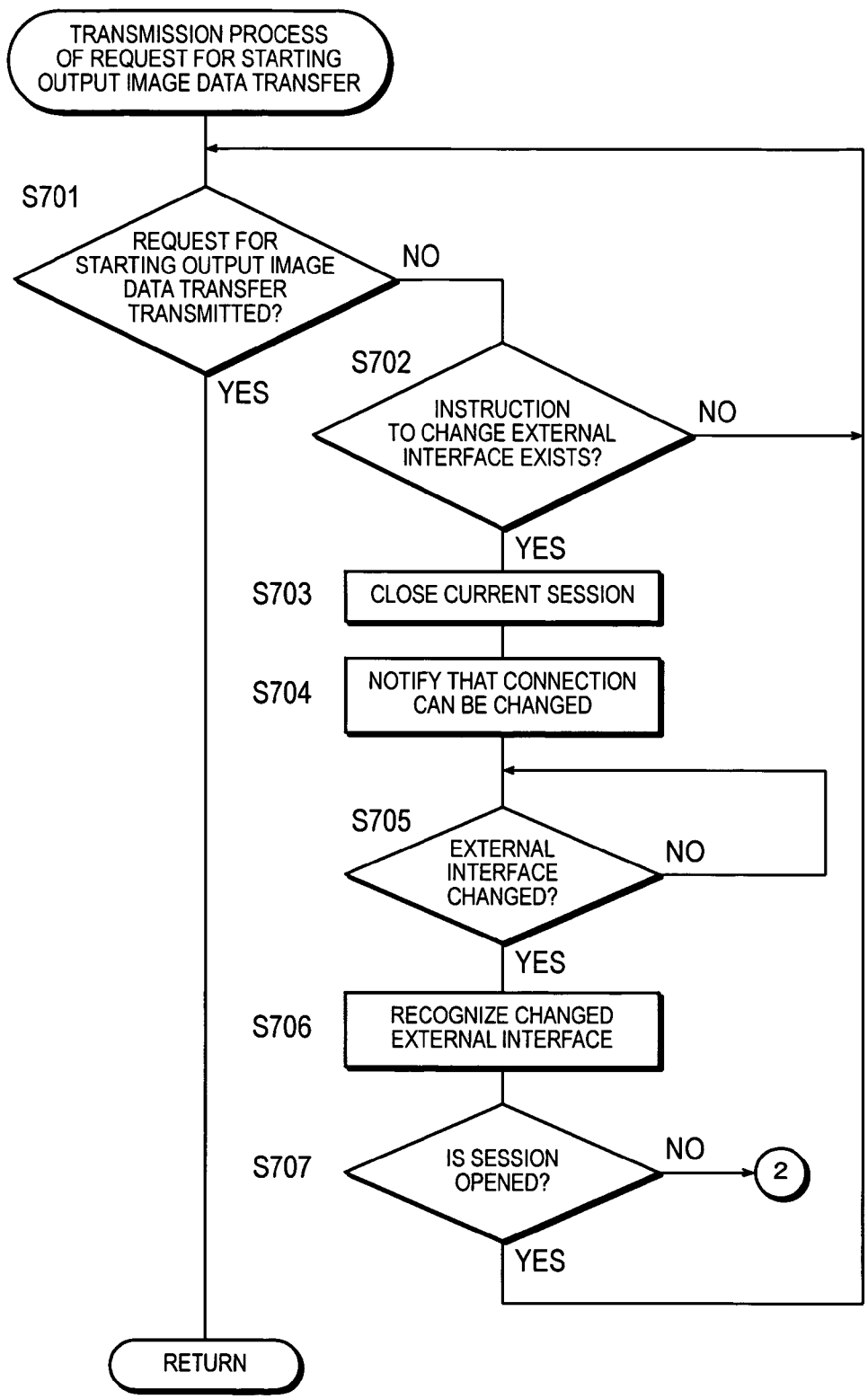
FIG. 11 is a flowchart showing the contents of a transmission process of a request for starting output image data transfer.
Figure 15:
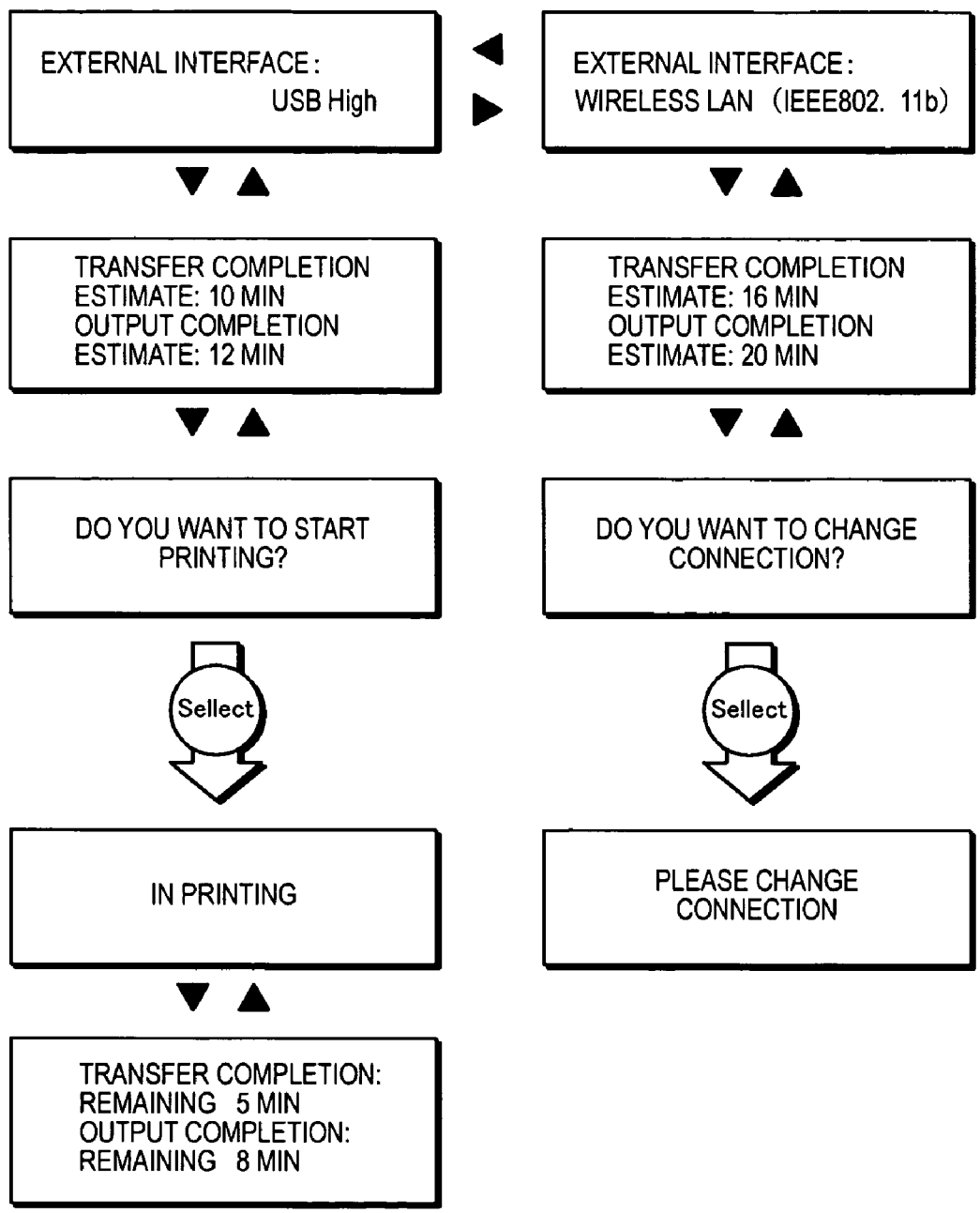
FIG. 15 is a view of an example display on the display part of an operating panel unit.

FIG. 11 is a flowchart showing the contents of a transmission process of a request for starting output image data transfer in step S505. FIG. 14 is a view of an example operating panel unit. FIG. 15 is a view of an example display on the display part of the operating panel unit. The transmission process of the request for starting output image data transfer will be described below with reference to FIG. 11, FIG. 14 and FIG. 15.

The operating panel unit 205 includes a display part 221 for displaying various information, a ring-shaped display switching unit 222 for switching display screens, and a select button 223 for receiving a user's selection. As the user presses the top, bottom, right, or left side, the display screen is switched as shown in FIG. 15 depending on the location where the display switching unit 222 is pressed.

The printer 200 first makes a judgment on whether a request for starting output image data transfer is transmitted to the digital camera 100 based on the user's operation or not (S701). More specifically, the type of the external interface currently being used, and the transfer completion time and the output completion time of the output image data when the particular external interface is used are displayed on the display unit 221 as shown in FIG. 15 by the user's operation of the display switching unit 222. When the user presses the select button 223 when a query "Do you want to start printing?" is displayed on the display unit 221, the request for starting the output image data transfer will be transmitted to the digital camera 100.

At this point, the user can make a selection of either to transfer the output image data via the valid external interface being used or to transfer the output image data via another external interface.

If it is judged that the request for starting the output image data transfer is not transmitted (S701: No), a judgment will be made as to whether an instruction for changing the external interface or not (S702). More specifically, another external interface, the transfer completion time and the output completion time of the output image data when the particular external interface is used are displayed on the display unit 221 as shown in FIG. 15 by the user's operation of the display switching unit 222. When the user presses select the button 223 when a query "Do you want to change the connection?" is displayed on the display unit 221, it is judged that an instruction for changing the external interface is made. If no instruction to change the external interface is made (S702: No), the program returns to step S701.

If an instruction to change the external interface is made (S702: Yes), the present session will be closed (S703), and it will be indicated that the connection change is possible (S704). More specifically, a prompt of "Please change the connection" will be displayed on the display unit 221 as shown in FIG. 15.

Next, the printer 200 waits until the external interface is actually changed (S705). When the external interface is changed (S705: Yes), the changed external interface is recognized (S706).

The printer 200 then makes a judgment on whether a session with the digital camera 100 via the changed external interface is opened or not (S707). For example, if the opening of a session with printer 100 is not confirmed (S707: No), the program advances to step S508 of the flowchart of FIG. 9. If the opening of a session with printer 100 is confirmed (S707: Yes), the program returns to step S701.

On the other hand, if it is judged that the request for starting the output image data transfer is transmitted in step S701 (S701: Yes), the program returns to the flowchart of FIG. 9.

The program then returns to the flowchart of FIG. 9, and the printing process is executed (S506).

Figure 12:
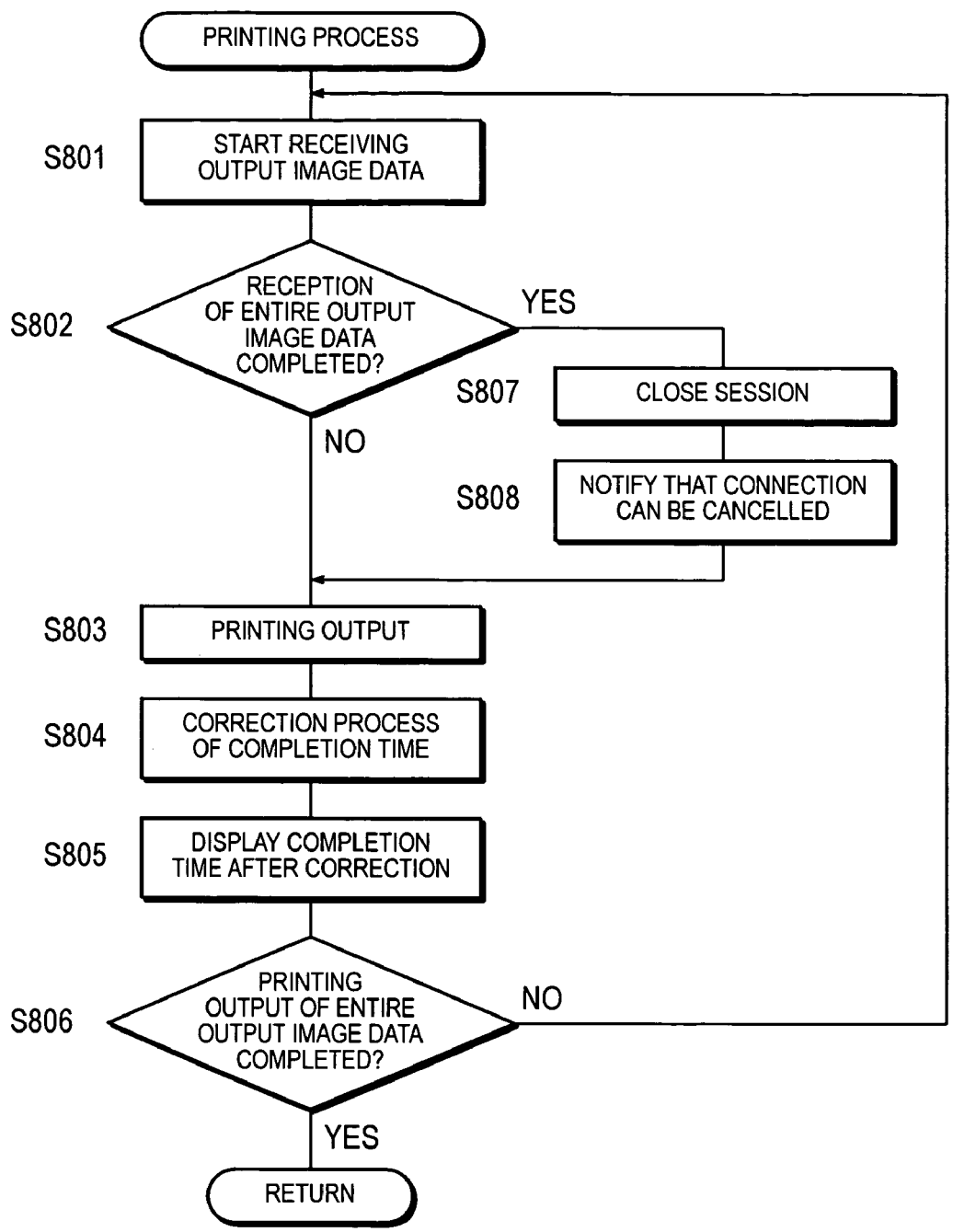
FIG. 12 is a flowchart showing the contents of a printing process.

FIG. 12 is a flowchart showing the contents of the printing process in step S506.

In the printing process, the printer 200 first starts receiving the output image data from the digital camera 100 (S801). At this time, the printer 200 receives the output image data transmitted by the digital camera 100 sequentially and stores the output image data into the memory. If the hard disk is built in, the output image data that overflows from the storage memory will be stored in the hard disk.

In step S802, a judgment is made as to whether the reception of the entire output image data is completed or not (S802).

When the reception of the entire output image data is completed (S802: Yes), the current session with the digital camera 100 is closed (S807), and a notification is made that the connection between the digital camera 100 and the printer 200 can be cancelled (S808). For example, a notification "Connection can be cancelled" will be displayed on the display unit 221.

If it is determined that the reception of the entire output image data is not completed in step S802 (S802: No), the output image data is read out sequentially from the memory for storage, and the read out output image data are printed sequentially on paper (S803).

The printer 200 corrects the transfer completion time and the output completion time referring to the time it took to receive and print a portion of the entire output image data (S804). The corrected transfer completion time and output completion time are displayed on the display unit 221 as the remaining time as shown in FIG. 15 (S805).

In step S806, a judgment is made as to whether the printing output of the entire output image data is completed or not. If the printing output is not completed (S806: No), the program returns to step S801. If the printing output is completed (S806: Yes), the program returns to the flowchart of FIG. 9.

As the program returns to the flowchart of FIG. 9, a judgment is made as to whether the printing process of the image data should be continued or not (S507). At this point, items for selecting whether the image data printing process to be continued or not are displayed on the display unit 221.

If an item for continuing the image data printing process is selected (S507: Yes), the program returns to step S501; if an item for not continuing the image data printing process is selected (S507: No), the process shown in FIG. 9 is terminated.

Next, with reference to FIG. 16 through FIG. 20, the operation of using memory card slot 209 as the external interface for connecting with the digital camera 100 is described below.

FIG. 16 through FIG. 20 are flowcharts showing the contents of a process on the printer 200. The algorithm indicated by the flowcharts of FIG. 16 through FIG. 20 is stored as a control program in a storage unit of the printer 200 such as the hard disk 204 of the printer 200, read out by the RAM 203, and is executed by the CPU 201 when the operation starts. The steps identical to those of the process shown in FIG. 5 through FIG. 12 are described in a simplified manner by partially omitting the contents.

Figure 16:
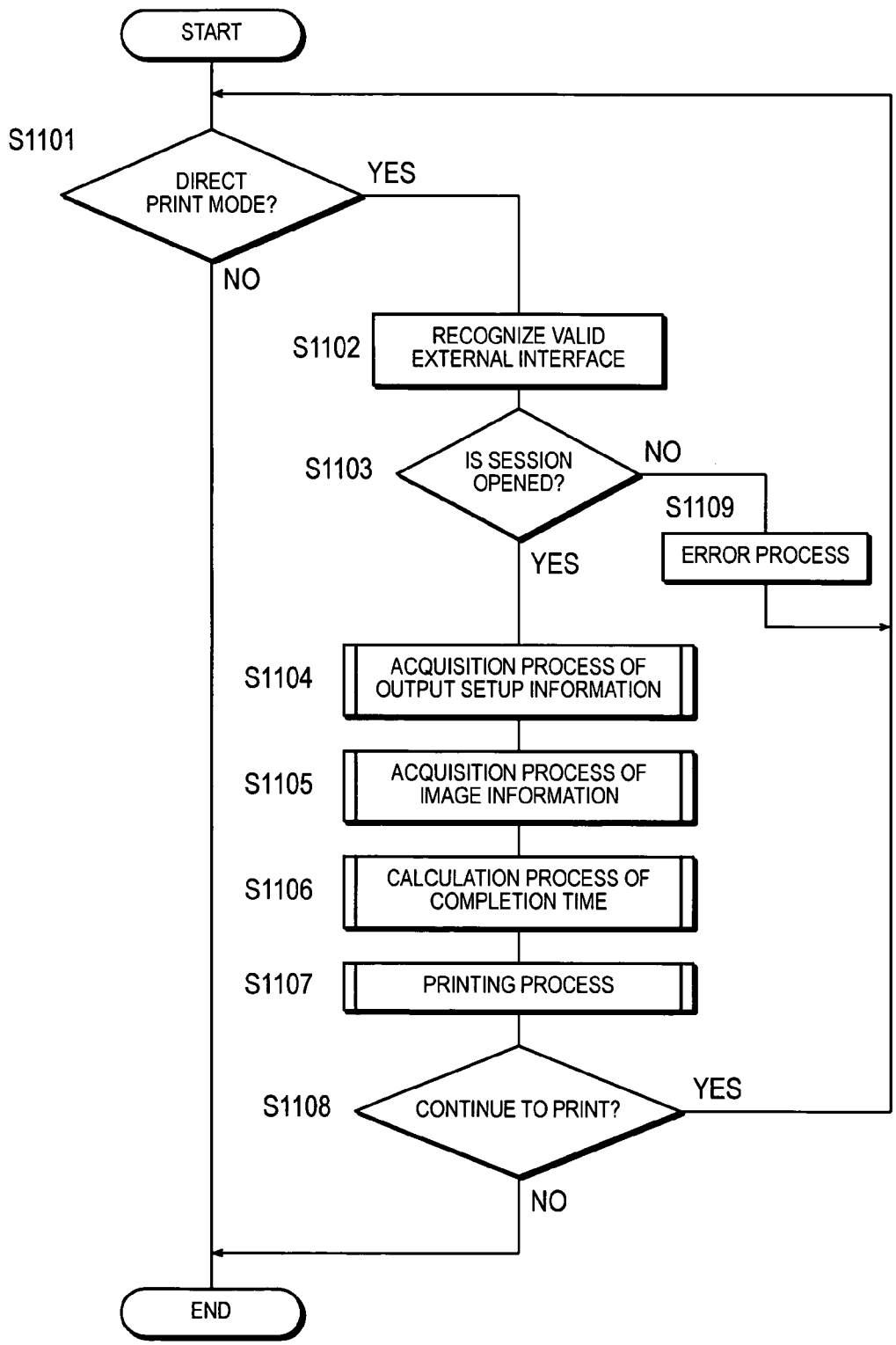
FIG. 16 is a flowchart showing the contents of a process on the printer.

First, the printer 200 confirms the processing mode and makes a judgment as to whether a direct print mode different from a normal print mode is set up or not (S1101). If the direct print mode is not set up (S1101: No), the process of FIG. 16 is terminated.

If the direct print mode is set up (S1101: Yes), the currently valid external interface is recognized (S1102). At this point, the memory card 400 is recognized as a valid external interface.

Next, the printer 200 makes a judgment as to whether a session with the memory card reading unit is opened (S1103). For example, if a session opening is not confirmed after a certain period of time (S1103: No), the printer 200 performs error processes (S1109), and the program returns to step S1101.

If the opening of a session is confirmed (S1103: Yes), the process of acquiring the output setup information is executed (S104).

Figure 17:
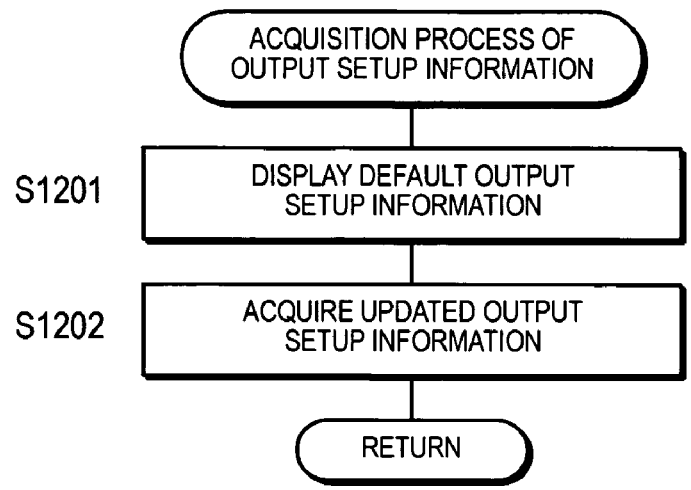
FIG. 17 is a flowchart showing the contents of an output setup information acquisition process.

FIG. 17 is a flowchart showing the contents of the output setup information acquisition process in step S1104. In the acquisition process of the output setup information, the printer 200 displays the default output setup information on the operating panel unit 205 (S1202).

Next, the printer 200 acquires the output setup information updated as needed based on the user's operation (S1203).

The program then returns to the flowchart of FIG. 16, and the process of acquiring the image data is executed (S1105).

Figure 18:
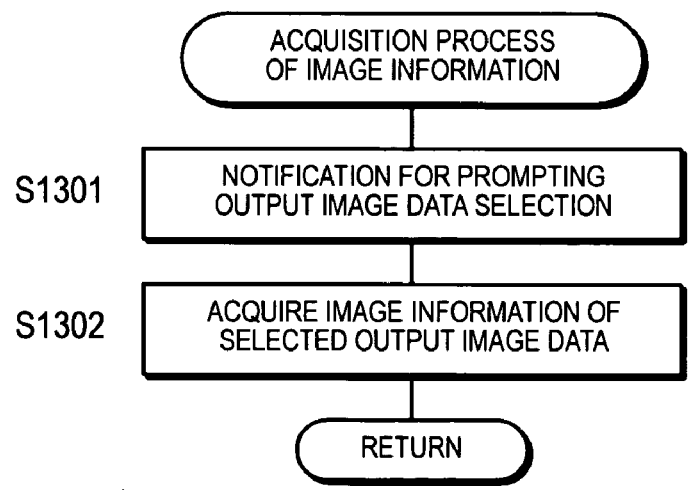
FIG. 18 is a flowchart showing the contents of an image information acquisition process.

FIG. 18 is a flowchart showing the contents of the image information acquisition process in step S1105. In the image information acquisition process, the printer 200 displays on the operating panel unit 205 a notice for prompting the user to select the image data to be printed (output image data) among the image data stored on the memory card 400 (S1301) For example, items such as the output of all the image data and only the selected image data are displayed on the operating panel unit 205. When the item for printing all the image data is selected, all the image data stored in the memory card 400 are selected automatically as the output image data. When the item for printing only the selected image data is selected, the items such as the index for all the image data stored in the memory card 400 are read out from the memory card 400 and displayed on the operating panel unit 205. The user can select here arbitrary image data as output image data. It is possible to select a plurality of image data. Next, image information, which is the information of the output image data, is readout from the memory card 400 and acquired (S1302).

The program then returns to the flowchart of FIG. 16, and the process of calculating the completion time is executed (S1106).

Figure 19:
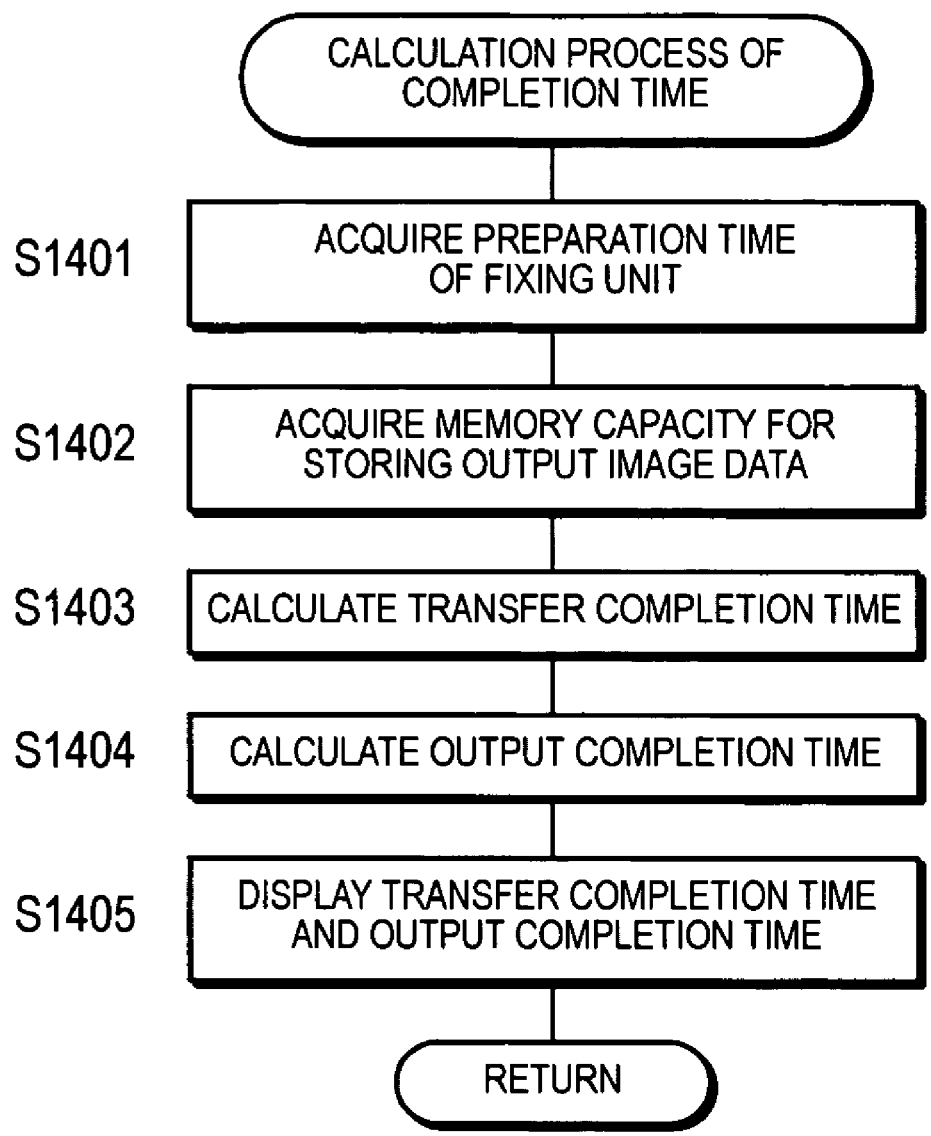
FIG. 19 is a flowchart showing the contents of a calculation process of completion time.

FIG. 19 is a flowchart showing the contents of the calculation process for the completion time in step S1106. In the process of calculating the completion time, the printer 200 acquires the preparation time for the fixing unit (not shown) in printing unit 206. (S1401). The printer 200 also acquires the capacity of the memory such as the RAM 203 that can store the output image data (S1402). If the hard disk is built in, the usable capacity of the hard disk is also acquired.

Using various types of information thus acquired, the printer 200 calculates the transfer completion time needed for transferring the output image data and the output completion time needed for printing output image data (S1403 and S1404). The calculated transfer completion time and output completion time are displayed on the operating panel unit 205 (S1405).

In the calculation of the transfer completion time and the output completion time, the speed of reading data from the memory card 400 is used as the speed of transferring data via the external interface. It is also possible here to constitute in such a way that the transfer completion time and the output completion time are calculated for all the external interface that are usable for the particular printer respectively, so that the user can select an external interface that is different from the currently valid external interface.

The program then returns to the flowchart of FIG. 16, and the printing process is executed (S1107).

FIG. 20 is a flowchart showing the contents of the printing process in step S1107.

In the printing process, the printer 200 first starts reading the output image data from the memory card 400 (S1501). At this point, the printer 200 reads the output image data from the memory card 400 sequentially and stores the output image data in the memory. If the hard disk is built in, the output image data that overflows from the storage memory will be stored in the hard disk.

In step S1502, a judgment is made as to whether the reading of the entire output image data is completed or not (S1502).

When the reading of the entire output image data is completed (S1502: Yes), the session with the memory card reading unit is closed (S1507), and a notification is made that the connection between the memory card 400 and the card slot 209 can be cancelled (S1508).

If it is judged that the reading of the entire output image data is not completed in step S1502 (S1502: No), the output image data is read out sequentially from the memory for storage, and the read out output image data are printed sequentially on paper (S1503).

The printer 200 corrects the transfer completion time and the output completion time referring to the time it took to receive and print a portion of the entire output image data (S1504). The corrected transfer completion time and the output completion time are displayed on the operating panel unit 205 as the remaining time (S1505).

In step S1506, a judgment is made as to whether the printing output of the entire output image data is completed or not. If the printing output is not completed (S1506: No), the program returns to step S1501. If the printing output is completed (S1506: Yes), the program returns to the flowchart of FIG. 16.

As the program returns to the flowchart of FIG. 16, a judgment is made as to whether the printing process of the image data should be continued or not (S1108). At this point, items for selecting whether the image data printing process to be continued or not are displayed on the operating panel unit 205.

If an item for continuing the image data printing process is selected (S1108: Yes), the program returns to step S1101; if an item for not continuing the image data printing process is selected (S1108: No), the process shown in FIG. 16 is terminated.

As can be seen from the above, this embodiment allows the printer 200 to acquire the data size of the image data to be printed from the data storage device, and calculate the transfer completion time required for transferring the image data to be printed according to the acquired data size of the image data to be printed and the transfer speed of the data via the external interface to be used.

Therefore, it is possible to provide in advance information of time required for transferring image data from the image data storage device to the printing device via the external interface.

Thus, it is possible for the user to know the completion of the transfer of the output image data via the external interface and to disconnect the connection via said external interface before the printing output is completed. Therefore, it is possible to provide a more effective usage environment for the digital camera as the digital camera can be used for other purposes more quickly.

Moreover, it is possible to obtain the transfer completion time and the output completion time that correspond to a plurality of external interfaces as information so that the user can select an appropriate external interface each time.

It is obvious that this invention is not limited to the particular embodiments shown and described above but may be variously changed and modified without departing from the technical concept of this invention.

For example, the digital camera 100 and the printer 200 do not have to be equipped with all of the external interfaces, i.e., a wired communication interface, a wireless communication interface, and a memory card slot, but rather can be equipped with only one or a combination of arbitrary two of them. For example, the digital camera 100 can have a flash ROM that can store image data instead of the memory card slot 109. In this case, the digital camera 100 can be equipped with a wired communication interface or a wireless communication interface. The digital camera 100 does not have to be equipped with either a wired communication interface or wireless communication interface. In this case, the digital camera 100 is equipped with the memory card slot 109.

Also, other types of image forming devices such as a copying machine and an MFP (multi-function peripheral) can be used in place of the printer.

In this invention, a portable image data storage device means a device that can store image data and that a person can easily walk around with, such as a digital camera and a memory card, including a device that a person can walk around wearing.

For example, the digital camera 100 can be replaced with other image data storage devices, such as a cellular telephone with a picture taking capability. Also, other recording medium such as a removable hard disk can be used instead of the memory card 400.

The means and method of conducting each of various processes in the printing system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded in the computer readable recording medium is normally transferred to and stored in a storage unit such as a hard disk. Said program can also be provided as independent application software or can be built into the software of the image forming device as a part of its function.

What is claimed is:

1. An image forming device for forming an image from image data transferred from a portable image data storage device via an external interface that can be connected to said image data storage device, comprising:

a data size acquiring unit that acquires data size of said image data, for which said image is formed, from said image data storage device; and a calculating unit for calculating transfer completion time required for transferring said image data, for which said image is formed, based on said data size of the image data acquired by said data size acquiring unit and a speed of transferring data via said external interface, wherein said calculating unit calculates a plurality of transfer completion times corresponding to a plurality of external interfaces; and said image forming device further comprises a transfer completion time notifying unit for notifying said plurality of transfer completion times calculated by said calculating unit, and a selecting unit for allowing an user to select one of said plurality of external interfaces as an external interface to be used.

2. An image forming device as claimed in claim 1 wherein the calculating unit calculates an output completion time required for image forming output of the image data, for which said image is formed.

3. An image forming device as claimed in claim 2 further comprising:

an output setup information receiving unit for receiving output setup information to be set up concerning image forming output condition.

4. An image forming device as claimed in claim 1 further comprising:

a cancellation capability notifying unit for notifying that it is possible to cancel a connection with said image data storage device before the image forming output is completed for said image data, for which said image is formed, after the transfer is completed for said image data, for which said image is formed.

5. An image forming device as claimed in claim 2 further comprising:

a cancellation capability notifying unit for notifying that it is possible to cancel a connection with said image data storage device before the image forming output is completed for said image data, for which said image is formed, after the transfer is completed for said image data, for which said image is formed.

6. An image forming device as claimed in claim 3 further comprising:

a cancellation capability notifying unit for notifying that it is possible to cancel a connection with said image data storage device before the image forming output is completed for said image data, for which said image is formed, after the transfer is completed for said image data, for which said image is formed.

7. An image forming device as claimed in claim 1, wherein said image data storage device is a digital camera.

8. An image forming device as claimed in claim 2, wherein said image data storage device is a digital camera.

9. An image forming device as claimed in claim 3, wherein said image data storage device is a digital camera.

10. An image forming device as claimed in claim 4, wherein said image data storage device is a digital camera.

11. An image forming device as claimed in claim 5, wherein said image data storage device is a digital camera.

12. An image forming device as claimed in claim 6, wherein said image data storage device is a digital camera.

13. An image forming device as claimed in claim 1, wherein said image data storage device is a recording medium.

14. An image forming device as claimed in claim 2, wherein said image data storage device is a recording medium.

15. An image forming device as claimed in claim 3, wherein said image data storage device is a recording medium.

16. An image forming device as claimed in claim 4, wherein said image data storage device is a recording medium.

17. An image forming device as claimed in claim 5, wherein said image data storage device is a recording medium.

18. An image forming device as claimed in claim 6, wherein said image data storage device is a recording medium.

19. An image forming system, comprising:
a digital camera; and
an image forming device for forming an image from image data transferred from said digital camera via an external interface that can be connected to said digital camera;
said digital camera including:
a transmitting unit for transmitting data size of image data, for which said image is formed, to said image forming device;
said image forming device including:
a receiving unit for receiving the data size of the image data, for which said image is formed, from said digital camera a calculation unit for calculating transfer completion time required for transferring said image data, for which said image is formed, based on said data size of the image data received by said receiving unit and a speed of transferring data via said external interface, and for calculating a plurality of transfer completion times corresponding to a plurality of external interfaces;
a transfer completion time notifying unit for notifying said plurality of transfer completion times calculated by said calculation unit, and
a selecting unit for allowing an user to select one of said plurality of external interfaces as an external interface to be used.

20. An image forming method for forming an image from image data transferred from a portable image data storage device via an external interface that can be connected to said image data storage device, comprising the steps of:
1) acquiring data size of said image data, for which said image is formed, from said image data storage device;
2) calculating transfer completion time required for transferring said image data, for which said image is formed, based on said data size of the image data acquired in step 1) and a speed of transferring data via said external interface;
3) calculating a plurality of transfer completion times corresponding to a plurality of external interfaces;
4) notifying said plurality of calculated transfer completion times; and
5) allowing an user to select one of said plurality of external interfaces as an external interface to be used.

21. An image forming control program, tangibly embodied in a computer-readable storage medium, for controlling an image forming device for forming an image from image data transferred from a portable image data storage device via an external interface that can be connected to said image data storage device, said program causing the image forming device to execute a process comprising the steps of:
1) acquiring data size of said image data, for which said image is formed, from said image data storage device;
2) calculating transfer completion time required for transferring said image data, for which said image is formed, based on said data size of the image data acquired in step 1) and a speed of transferring data via said external interface;
3) calculating a plurality of transfer completion times corresponding to a plurality of external interfaces;
4) notifying said plurality of calculated transfer completion times; and
5) allowing an user to select one of said plurality of external interfaces as an external interface to be used.

22. A page printer for forming an image from image data transferred from a portable image data storage device via an external interface that can be connected to said image data storage device, comprising:
a data size acquiring unit that acquires data size of said image data, for which said image is formed, from said image data storage device; and
a calculating unit for calculating transfer completion time required for transferring said image data, for which said image is formed, based on said data size of the image data acquired by said data size acquiring unit and a speed of transferring data via said external interface,
wherein the page printer uses an electrophotography type process;
said calculating unit calculates a plurality of transfer completion times corresponding to a plurality of external interfaces; and
said page printer further comprises a transfer completion time notifying unit for notifying said plurality of transfer completion times calculated by said calculating unit, and a selecting unit for allowing a user to select one of said plurality of external interfaces as an external interface to be used.

23. A page printer as claimed in claim 22 wherein
the calculating unit calculates an output completion time required for image forming output of the image data, for which said image is formed.

24. A page printer as claimed in claim 23 further comprising:
an output setup information receiving unit for receiving output setup information to be set up concerning image forming output condition.

25. A page printer as claimed in claim 22 further comprising:
a cancellation capability notifying unit for notifying that it is possible to cancel a connection with said image data storage device before the image forming output is completed for said image data, for which said image is formed, after the transfer is completed for said image data, for which said image is formed.

26. A page printer as claimed in claim 22, wherein said image data storage device is a digital camera.

27. A page printer as claimed in claim 22, wherein said image data storage device is a recording medium.

28. An image forming system, comprising:
a digital camera; and a page printer for forming an image from image data transferred from said digital camera via an external interface that can be connected to said digital camera;

said digital camera including:

a transmitting unit for transmitting data size of image data, for which said image is formed, to said page printer;

said page printer including:

a receiving unit for receiving the data size of the image data, for which said image is formed, from said digital camera; and a calculation unit for calculating transfer completion time required for transferring said image data, for which said image is formed, based on said data size of the image data received by said receiving unit and a speed of transferring data via said external interface, wherein the page printer uses an electrophotography type process;

said calculation unit calculates a plurality of transfer completion times corresponding to a plurality of external interfaces; and said page printer further comprises a transfer completion time notifying unit for notifying said plurality of transfer completion times calculated by said calculation unit, and a selecting unit for allowing a user to select one of said plurality of external interfaces as an external interface to be used.

29. An image forming method for forming an image, by a page printer, from image data transferred from a portable image data storage device via an external interface that can be connected to said image data storage device, comprising the steps of:

1) acquiring, by said page printer, data size of said image data, for which said image is formed, from said image data storage device; and 2) calculating, by said page printer, transfer completion time required for transferring said image data, for which said image is formed, based on said data size of the image data acquired in step 1) and a speed of transferring data via said external interface, wherein the page printer uses an electrophotography type process;

said calculating calculates a plurality of transfer completion times corresponding to a plurality of external interfaces; and said page printer further comprises a transfer completion time notifying unit for notifying said plurality of transfer completion and a selecting unit for allowing a user to select one of said plurality of external interfaces as an external interface to be used.

30. An image forming device for forming an image from image data transferred from a portable image data storage device via an external interface that can be connected to said image data storage device, comprising;

a data size acquiring unit that acquires data size of said image data, for which said image is formed, from said image data storing device;

a calculation unit for calculating a transfer completion time required for transferring said image data, for which said image is formed, based on said data size of the image data acquired by said data size acquiring unit and a speed of transferring data via said external interface; and a transfer completion time notifying unit for notifying the calculated transfer completion time to a user, wherein the external interface is compatible to a plurality of data transfer standards, wherein the calculation unit calculates a plurality of transfer completion times required for transferring said image data, corresponding to the data transfer standards, respectively; and wherein the transfer completion time notifying unit notifies the plurality of calculated transfer completion times to a user.

31. An image forming device for forming an image from image data transferred from a portable image data storage device via an external interface that can be connected to said image data storage device, comprising;

a data size acquiring unit that acquires data size of said image data, for which said image is formed, from said image data storing device;

a calculation unit for calculating a transfer completion time required for transferring said image data, for which said image is formed, based on said data size of the image data acquired by said data size acquiring unit and a speed of transferring data via said external interface; and a transfer completion time notifying unit for notifying the calculated transfer completion time to a user, wherein said image forming device includes a plurality of external interfaces, wherein the calculation unit calculates a plurality of transfer completion times required for transferring said image data, corresponding to the plurality of external interfaces, respectively; and wherein the transfer completion time notifying unit notifies the plurality of calculated transfer completion times to a user.

32. The image forming device of claim 30, wherein the calculation unit calculates an output completion time required for image forming output of the image data, for which said image is formed.

33. The image forming device of claim 30, further comprising:

an output setup information receiving unit for receiving output setup information to be set up concerning an image forming output condition.

34. The image forming device of claim 30, further comprising:

a cancellation capability notifying unit for notifying that it is possible to cancel a connection with said image data storage device before the image forming output is completed for said image data, for which said image is formed, after the transfer is completed for said image data, for which said image is formed.

35. The image forming device of claim 31, wherein the calculation unit calculates an output completion time required for image forming output of the image data, for which said image is formed.

36. The image forming device of claim 31, further comprising:

an output setup information receiving unit for receiving output setup information to be set up concerning an image forming output condition.

37. The image forming device of claim 31, further comprising:

a cancellation capability notifying unit for notifying that it is possible to cancel a connection with said image data storage device before the image forming output is completed for said image data, for which said image is formed, after the transfer is completed for said image data, for which said image is formed.

* * * * *